2,789,909
PROCESS FOR FREEZE-DRYING SOFT CHEESE

Earl W. Flosdorf, Forest Grove, and William H. Hamilton, Philadelphia, Pa., assignors to F. J. Stokes Corporation, a corporation of Pennsylvania No Drawing. Application March 14, 1952, Serial No. 276,694

2 Claims. (Cl. 99—115)

This invention relates to an improved process for drying soft cheese to produce a dried product which, on restoration by the addition of water, gives a restored product which is the substantial equivalent of the fresh cheese, which dried product has storage stability and hence may be handled, shipped and the like, without the precautions required in handling fresh soft cheeses.

Freeze-drying is now a well-established technique for the preservation of labile aqueous materials, including foods, biologicals, vitamins, hormones, etc. Its application to the drying and preservation of soft cheeses has been described. See Patent 2,576,597. In general, the process of freeze-drying involves freezing the material to be dried and then removing the water therefrom with the aid of a vacuum while maintaining the temperature of the material sufficiently low so that it at most softens, but does not liquefy or melt during the drying. This normally involves maintaining the temperature below the freezing point until most of the water initially present is removed, and then to facilitate the removal of the last portions of water raising the temperature at the end of the operation.

It has, so far as we know, been regarded as important to freeze the material quickly, for example, by what is called "self-freezing," which means applying a vacuum to the material to cause evaporative cooling, with resulting super-cooling and sudden freezing, or the use of low temperature refrigerants, for example, refrigerants maintained below about $-20°$ C., and it is generally thought that the more rapidly the freezing is carried out, and the lower the temperature of the refrigerant used for the freezing the better the quality of the dried product and the more closely it approximates, on restoration, the fresh material from which it is derived. Thus, in carrying out the freeze-drying operations there has normally been selected a refrigerant temperature as low as is economically feasible for the material being dried. This is particularly true in the case of relatively complex products such as proteinaceous food stuffs, biologicals, and the like. Relatively pure materials, such as certain antibiotics and hormones, are not as sensitive to rate of freezing as are the more complex products.

We have found that in the freeze-drying of soft cheeses such as cottage cheese, baker's cheese, Neufchatel cheese, farmer's cheese, buttermilk cheese and the like, contrary to all expectations and to what we believe to be the accepted beliefs of those familiar with freeze-drying, a superior product is obtained if the cheese is frozen slowly rather than quickly. We have found that the dried product following slow freezing is softer, more porous, can be broken up or granulated more easily and reconstitutes on the addition of water more rapidly than a product dried in substantially the same way except with quick freezing.

By slow freezing we mean freezing under conditions such that it takes an excess of one-half hour to freeze the cheese and advantageously takes three to four hours, or even longer. To accomplish this, we use a refrigerant maintained at a temperature above about $-20°$ C., but, of course, below the freezing point of the cheese, and expose it to such refrigerant, directly or indirectly, under conditions such that the freezing takes place no faster than specified above. We have found that self-freezing and rapid freezing give less satisfactory products. We have no explanation to offer for this difference in observed results which, as we have noted, appear to be contrary to what would be expected on the basis of all of the available knowledge on freeze-drying.

The freezing of the cheese may be carried out by placing the cheese in a properly refrigerated box or room, for example, a room maintained at a temperature of about $-15$ to $-18°$ C., in which the refrigerated air serves as the refrigerant. Freezing may be carried out by placing the cheese in trays and placing the trays on cooled shelves, through which is circulated a cooling medium maintained at a temperature of about $-15$ to $-18°$ C. or even somewhat warmer as long as it is below the freezing point of the cheese. Where the drying is subsequently carried out in chambers in which the cheese is placed in trays on shelves disposed within the chambers with a heat exchange medium circulating through the shelves, this latter method is advantageously used, as after the freezing is completed, the chambers may be evacuated and heat supplied to the frozen cheese to accelerate drying by circulating a heating medium through the shelves in accordance with established practice.

In one specific comparison, we froze cottage cheese by exposing it to air maintained at a temperature below $-20°$ and above $-15°$ C., the cheese being disposed in trays in layers one-half inch deep. The cheese took about 3 hours to freeze. It was then dried by standard technique, by placing the trays in vacuum chambers, and circulating a heating medium at $+35°$ through the spaces in the shelves while applying the usual vacuum. The drying cycle was approximately twenty hours. The product was very light in color, soft, porous and broke up easily and reconstituted rapidly on the addition of water.

Another portion of the cheese was frozen in trays in layers one-half inch thick by placing the trays containing the cheese in a vacuum chamber and applying a vacuum until the evaporative cooling resulted in freezing. Thereafter the cheese was dried in the same way. The drying cycle was approximately fifteen hours. The product was light in color, but was relatively firm and reconstituted quite slowly, requiring about twenty-nine hours in water at $46°$ C., at which time it was still not completely restored.

The third portion of the same cheese was dried under very similar conditions. The freezing was accomplished by placing the cheese in ½ inch layers in stainless steel trays placed on cracked Dry Ice. It was then dried under the conditions described above, the drying cycle being about thirty hours. The product was light in color but was relatively firm and difficult to break up and reconstituted slowly, being very similar in this respect to the product obtained when self-freezing was used.

It may be noted that there are differences in the time of the drying cycle, the first being about twenty hours, the second fifteen and the third about thirty hours. These differences in drying times could not, we believe, be responsible for the observed differences in the final dried products. The difference in the nature of the products can only be attributed to the influence of the freezing step.

We claim:
1. In the freeze-drying of soft cheese, the step of freezing the cheese to be dried at a rate such that it requires at least one-half hour to become frozen, such freezing being accomplished by abstracting heat from the cheese by exposure thereof to a refrigerant maintained at a temperature higher than −20° C. and below the freezing point of the cheese.

2. The process of drying soft cheese which includes freezing the cheese by exposure thereof to a refrigerant maintained at a temperature higher than −20° C. at a rate such that the period of time required for the freezing is at least one-half hour, and removing water from the frozen cheese by subjecting it to a vacuum.

References Cited in the file of this patent
UNITED STATES PATENTS

| | | |
|---|---|---|
| Re. 18,364 | Tival | Feb. 23, 1932 |
| 1,970,956 | Elser | Aug. 21, 1934 |
| 1,997,866 | Irvin | Apr. 16, 1935 |
| 2,066,302 | Reichel | Dec. 29, 1936 |
| 2,225,627 | Flosdorf | Dec. 24, 1940 |
| 2,446,550 | North et al. | Aug. 10, 1948 |
| 2,576,597 | Gootgeld | Nov. 27, 1951 |